[15] 3,688,956
[45] Sept. 5, 1972

United States Patent

Kjos

[54] MAGNETIC TAPE TRANSPORT WITH CAPSTAN DRIVE

[72] Inventor: Magne J. Kjos, Lake Lindero, Calif.

[73] Assignee: Burroughs Corporation, Detroit, Mich.

[22] Filed: Sept. 23, 1970

[21] Appl. No.: 74,696

[52] U.S. Cl. ....................226/7, 179/100.2 P, 226/97

[51] Int. Cl. ..............................................B65h 17/32

[58] Field of Search .........226/7, 95, 97; 179/100.2 P, 179/100.2 PM; 340/174.1 E

[56] References Cited

UNITED STATES PATENTS 3,125,265 3/1964 Warren....................226/97 X
3,420,424 1/1969 Barbeau......................226/97
3,433,427 3/1969 Brown.....................226/97 X
3,472,436 10/1969 Jura.........................226/97 X

*Primary Examiner*—Richard A. Schacher
*Attorney*—Christie, Parker & Hale

[57] ABSTRACT

In a magnetic tape transport, an electromagnetic transducer assembly is positioned adjacent a capstan tape drive. Magnetic tape wraps around the capstan and the capstan moves the tape past the transducer. Fluid pressure applies a force on the tape at a position in between the transducer assembly and capstan which forces the tape away from the capstan toward the transducer assembly.

20 Claims, 3 Drawing Figures

PATENTED SEP 5 1972 3,688,956

INVENTOR.

MAGNETIC TAPE TRANSPORT WITH CAPSTAN DRIVE

BACKGROUND OF THE INVENTION

1. Field of the Invention

This invention relates to magnetic tape transports which achieve a high rate of tape transfer between reels and past an operational zone including one or more electromagnetic heads and which also exhibit extremely fast start/stop characteristics. More specifically, the invention relates to tape transports of the type above-described wherein tape is driven past the operational zone by a capstan-type drive.

2. Description of the Prior Art

High speed magnetic tape transports are well known which include a capstan for driving tape past an operational zone including a transducer assembly having one or more electromagnetic heads. Because of the required rapid acceleration or deceleration of the tape, however, a separate tape buffer stage is included on each side of the capstan between such capstan and supply and take-up reels. The tape buffer storage stages are generally vacuum columns that buffer tape during rapid acceleration and deceleration of the tape. These vacuum buffers also insure against tape damage resulting from the very fast accelerated start-up of the tape by the capstan as compared with the relatively slower accelerated start-up by the associated take-up and supply reels due to their higher moments of inertia.

In such tape transports, it is not only desirable to have extremely high tape transfer speeds in order to achieve fast access to recorded data areas, but is it required that the distance of tape travel from a stop read or write command to a static condition of the tape or from a start read or write command to normal operating speed of the tape be very short. The reason is that the digital data is recorded in segments on magnetic tape with each segment spaced apart from its adjacent segments a very small amount, e.g. 0.5 to 0.75 inch. Accordingly, tape must be up to desired speed within this small distance so that the information can be reliably read or written. Additionally, the tape must be stopped well within this same distance to insure that the following information is not lost when tape is started up again.

Dual capstan tape transports are common which use a pair of oppositely rotating vacuum capstans to drive tape in either direction past an electromagnetic head. The electromagnetic head is placed adjacent the tape and in between the two capstans. A pair of compliant or edge guides are located adjacent the tape at either side of the head for insuring proper lateral position between tape and head. The inertia of the tape, inertia of the capstans and frictional resistance to tape travel severely limits the acceleration and deceleration of the tape. In such dual-capstan drives, it makes no difference what direction the tape is traveling past the head for the frictional resistance on the length of tape between capstans is always the same.

Single capstan tape drive systems have been developed with the head placed adjacent a portion of the tape as in the dual-capstan drives. Vacuum buffers are placed on either side of the capstan in between the capstan and take-up and supply reels. However, the head is positioned on one side of the capstan and in between the capstan and one of the buffers. Thus, the system is said to be "assymmetrical" with the frictional resistance induced by the guides, head, and other equipment adjacent the tape being appreciably more on one side of the single capstan than on the other.

If the aforementioned single capstan system is accelerating tape from the side of the capstan, containing the head, to the other side, no problem is discerned from the friction-producing members because the tape is being dragged past them. If the capstan is accelerating tape at high rates in the opposite direction, the frictional resistance and inertia of the tape become a significant problem. A sufficient vacuum force must be provided so that the tape is evenly pulled past the guides and head. Such sufficient vacuum force cannot always be obtained because the tape tension requirements impose a maximum limit on the vacuum force. Hence the tape may buckle thereby slowing up the acceleration of the tape past the head. Thus, it takes a longer period of time to get tape up to the desired operating speed of the tape. This presents major problems as acceleration of the tape is increased.

An additional problem occasioned by asymmetry involves the nature and purpose of the pair of vacuum buffers. Each of the buffers is vacuum operated in order to contain tape therein in loop-form, for buffering to and from the capstan. During start-up, the buffers not only buffer tape, but greatly aid in the acceleration process of the tape by the capstan. With these buffers, therefore, the rate of acceleration may be increased. In this regard, it is important that the length of tape between the capstan and the bottom of the tape loop in each of the pair of buffers be as short as possible. The longer the lengths, the more mass that must be moved and accelerated by the buffers; thus, the slower the acceleration and attainment of desired speed. In the above-described asymmetrical single capstan arrangement, the tape path between capstan and the buffers must be longer hence introducing more inertia.

A tape transport is known which uses a pair of electromagnetic head assemblies positioned adjacent a single capstan. Tape is forced against the head assemblies by an associated guide post positioned in between the pair of head assemblies. The arrangement reduces the length of tape needed between the capstan and the vacuum buffers as the heads are positioned adjacent tape which is wrapped around the capstan itself. Despite this advantage, the guide post and head arrangement adds to the frictional resistance to tape travel thereby decreasing the maximum acceleration of the tape. Since the transport is for instrumentation purposes where fast tape acceleration and deceleration is not usually important, the above arrangement is sufficient for such purposes.

The above-described transport is, however, deficient for the purposes of fast tape starting and stopping. For instance, the guide post is displaced at one side of each of the heads to draw the tape away from the capstan and against the heads. As a result, a substantial amount of tape is held away from the capstan which reduces the area of frictional engagement between the capstan and tape. Therefore, a larger capstan is required to increase the area of contact between tape and capstan resulting in a higher capstan inertia thereby decreasing the acceleration and deceleration capabilities of the capstan.

Additionally, the guide and head configuration of the above-described transport causes a large tape segment to be pulled away from the capstan in the area of the head. This substantially increases the possibility of longitudinal tape flutter and tape flutter normal to the surface of the tape due to inertia of the tape as higher and higher accelerations and decelerations are imposed on the tape by the capstan.

It has been proposed that one of the pair of head assemblies can be removed, thereby providing a single head assembly. This is desirable in high speed tape transports where friction on the tape is to be reduced and where read and write heads are provided in the same head assembly. However, removal of one head in the last-mentioned device introduces an asymmetrical path for the tape on each side of the head, and as a result, different acceleration and deceleration characteristics are obtained in one direction of the capstan than the other. Furthermore, the guide on one side of the head would still cause a large tape segment to be held away from the capstan, thus requiring a large capstan.

In addition to eliminating the disadvantages inherent in the prior art, as above described, it is desirable to provide a high speed transport including means for automatically reducing tape to head pressure which is desirable during high speed rewind of the tape. Furthermore, it is desirable to easily vary tape to head pressure with varying tape speeds to maintain a desired tape-to-head spacing.

SUMMARY OF THE INVENTION

A high speed tape transport, according to the present invention, comprises a tape transporting and reading assembly including a bidirectional capstan about which such tape is wrapped and by which such tape is driven. A transducer assembly is positioned adjacent the capstan in reading relation with a portion of such tape which is passing around the capstan. A means is provided for directing a force on such tape at a position in between the transducer assembly and the capstan which forces the tape away from the capstan and against the transducer assembly. Preferably, the force directing means includes means for directing a fluid pressure against such tape.

An important advantage of applying the force in between the transducer assembly and capstan is that the force can be adjusted easily to give proper tape to transducer assembly spacing. Thus, using air pressure as the force directing means, the air pressure is easily adjusted for proper spacing. Adjustment of tape to transducer assembly spacing is most difficult in the last-mentioned prior art device.

In an embodiment of the present invention, a capstan is provided having a peripheral surface about which magnetic tape is driven and an electromagnetic transducer adjacent a segment of the peripheral surface for reading or writing relative to the tape as it passes about the segment. Fluid pressure means is included for repelling the tape away from the segment and toward the head so that the tape is flown at the head and has its point of maximum excursion (repulsion), from the capstan peripheral surface, most-adjacent the head. Thus, the system can be made effectively symmetrical on either side of the head even when one head assembly is used.

A method, according to the present invention, comprises the step of repelling the tape away from the segment of the capstan peripheral surface and toward the head so that the part of the tape repelled furthest from the capstan is also the part most-adjacent the head. Thus, as with the apparatus above-described, the peak distance of tape repulsion is at the proper operating distance from the head.

The preferred embodiment of the invention is able to achieve tape speeds of over 350 ips. This unusually high speed is coupled with low frictional drag (but constant in either direction due to system symmetry) and minimal tape length and mass of unsupported tape in the area of the transducer assembly. As a result faster acceleration and deceleration is possible than has heretofore been possible.

BRIEF DESCRIPTION OF THE DRAWING

These and other aspects and advantages of the present invention are more clearly described with reference to the drawing in which.

DESCRIPTION OF THE PREFERRED EMBODIMENTS

Figures 1, 2, 3:
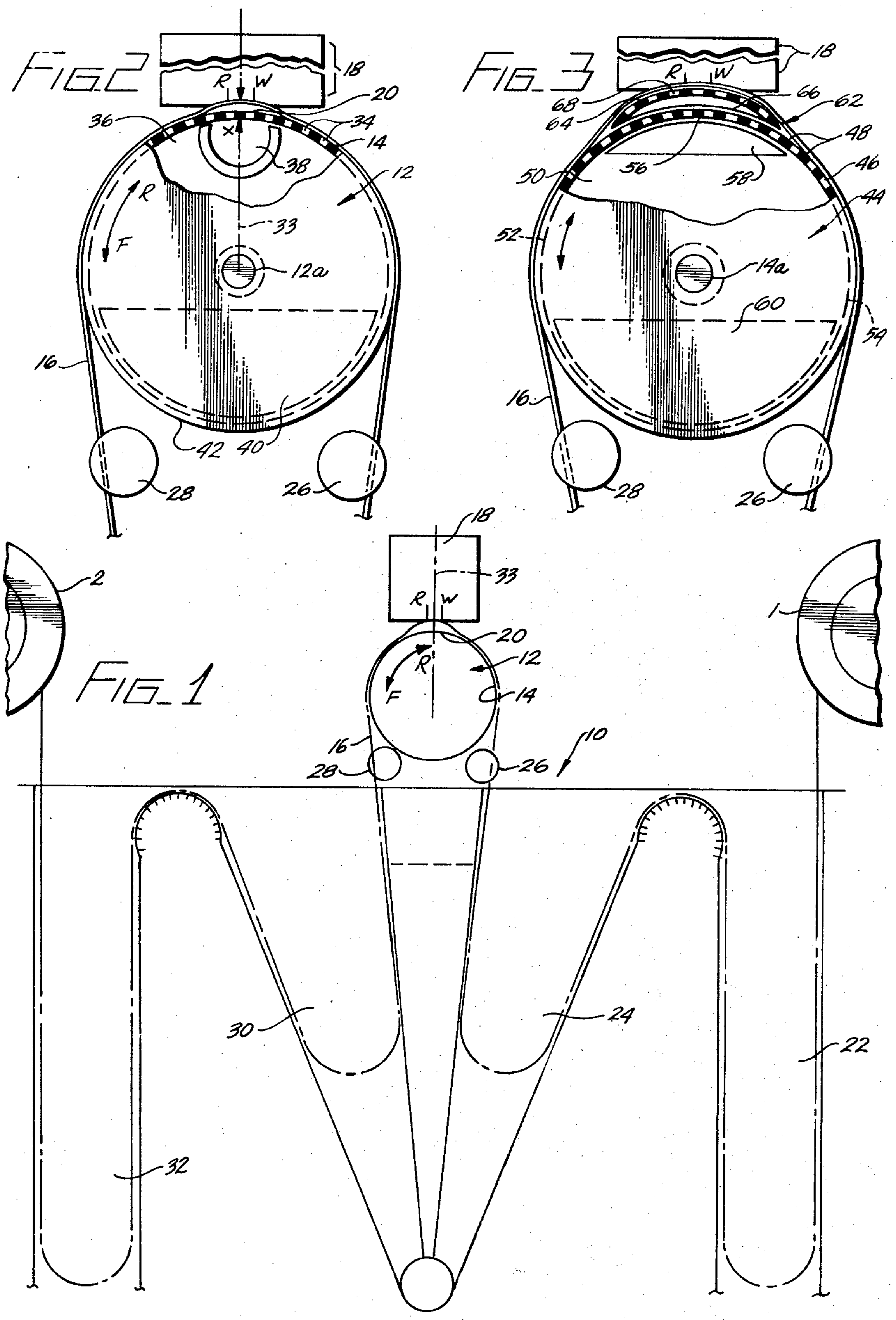
FIG. 1 is a schematic diagram of a single capstan high-speed magnetic tape transport having tape vacuum buffers and embodying the present invention.
FIG. 2 is a blown-up fragmentary view of the capstan and head arrangement of FIG. 1.
FIG. 3 is a blown-up fragmentary view of an alternative capstan and head arrangement according to the present invention.

FIG. 1 shows an improved transducer assembly and capstan arrangement, according to the present invention, in a high-speed magnetic tape transport 10. A bidirectional tape drive capstan 12 has a peripheral surface 14 about which a magnetic tape 16 is driven between supply and take-up reels 1 and 2. A transducer assembly 18, including one or more electromagnetic read and/or write heads, is located adjacent a segment 20 of peripheral surface 14. Tape 16 is guided to capstan 12 from a supply reel 1 through a vacuum column 22, a tapered vacuum buffer 24 and a compliant guide 26. Similarly, tape is guided from the capstan 12 to a take-up reel 2 through a compliant guide 28, a tapered vacuum buffer 30 and a vacuum column 32.

Vacuum buffers 24 and 30 and vacuum columns 22 and 33 all buffer tape. Vacuum draws tape into the columns and buffers. The buffers 24 and 30 buffer higher speed tape accelerations and decelerations. Tape vacuum buffers and columns are well known in the magnetic tape art and are not further described herein.

As clearly seen in FIG. 1, tape transport 10 is entirely symmetrical about a line 33 passing through the centers of the transducer assembly and capstan. The symmetry of the transport is directly brought about and made possible by the arrangement shown and described in detail with regard to FIG. 2, below. In transport 10, the tape length on either side of the capstan is kept as short as possible since there no longer is an added length of tape for which the operational zone (transducer assembly) must be adjacent to. In other words, the disadvantages inherent in asymmetrical transports are substantially reduced. The same beneficial results can be achieved by eliminating the additional buffers 24 and 30 and by feeding tape 16 directly from guide 28 into column 32 appropriately located substantially where buffer 30 is, and by feeding tape 16 directly from column 22 located substantially where buffer 24 is, to guide 26.

A major feature of the invention shown in FIGS. 1 and 2 is the way in which tape is forced from the capstan against the head 18. As indicated by the slight bulge at segment 20 of the capstan, a force is applied against the tape in between the capstan and the head 18 which repels the tape away from the capstan 12 and against the head 18.

Capstan 12 is a pneumatic capstan with a peripheral surface 14 having a plurality of spaced apertures 34 defined therein. However, the capstan 12 could be constructed in other ways, for example, it could be formed of a porous material. Tape is driven along a major portion of the capstan's peripheral surface. The major portion of the capstan is defined by and bounded by an internal area 36 of negative air pressure, or vacuum, contained within the capstan. Since peripheral surface 14 has spaced apertures 34, area 36 effectively draws tape 16 to surface 14 about the portion. This establishes an appropriate frictional engagement between tape 16 and capstan 12 allowing the tape to be driven by the capstan.

In the embodiment of FIGS. 1 and 2, the means for forcing is air pressure delivered by a tube 38. Tube 38 extends inside of capstan 12 and has the end (not shown) facing out of the drawing blocked off. The upper surface of tube 38 is cut away and fits up against the inside wall of capstan 12 allowing air pressure, applied to the tube 38, to pass out of the tube through the wall of the capstan 12 and against the tape. Tube 38 is located directly under head 18 thereby applying a force (air pressure) on the tape directly in between the capstan and head.

In order that tape 16 is not attracted about the full periphery of the capstan by area 36, absent segment 20, a "vacuum block" 40 is positioned within capstan 12 and separates area 36 from a minor portion 42 of surface 14. Block 40 prevents the negative air pressure from area 36 from drawing tape to surface 14 about the lower portion thereof. This allows the tape to be properly fed to and from the capstan by compliant guides 26 and 28.

As best shown in FIG. 2, tape 16 is repelled from surface 14 at segment 20 thereof to a peak distance therefrom of X which is directly under head 18. Area 38 and head 18 are arranged such that the peak distance is aligned with line 33 passing through the centers of head 18 and the capstan 12 and lies midway between the major portion of surface 14 along which tape is attracted by area 36.

Capstan 12 is rotatably mounted on a shaft 12a through which the capstan is driven in either one of its two directions of rotation. The capstan is generally hollow and cylindrical in shape with its end, facing out of the drawing, closed off. The back side of the capstan is open and abuts against a plate (not shown), so that there are only negligible amounts of air leakage. Vacuum is applied through an opening (not shown) in the plate to the interior of hollow interior of capstan 12. Tube 38 passes through the same plate to the source of air pressure. Vacuum capstans are well known in the art and further details thereof are not given herein.

An alternative capstan and head arrangement is shown in FIG. 3. The air pressure to force the tape away from the capstan and against the head is provided by a tube 62 positioned in between the capstan and head rather than inside of capstan 12 as in FIG. 2. A pneumatic capstan 44, very similar to capstan 12 of FIG. 2, includes a peripheral surface 46 having a plurality of spaced apertures 48 defined therein. An area 50 of negative air pressure is contained within the capstan 44 and abuts opposite portions 52 and 54.

Head assembly 18 is positioned adjacent a segment 56 of the peripheral surface defined between and abutting portions 52 and 54. A vacuum block 58, similar to block 40 of capstan 12, is located immediately adjacent segment 56 within the capstan and bounds the upper extent of area 50. Negative air pressure is thereby prevented from attracting tape 16 to surface 46 about segment 56. An additional vacuum block 60, identical in design and function to block 40 of capstan 12, is defined within capstan 44 between portions 52 and 54 at the lower extent of area 50. Negative air pressure is thereby prevented from attracting tape 16 to surface 46 at all places between portions 52 and 54.

In order to force the tape 16 away from capstan 44 toward head assembly 18, a means for providing fluid pressure is positioned in between capstan 44 and head 18. The means includes tube 62 having substantially convex wall 64 terminally intersecting a substantially concave wall 66. Wall 64 has a plurality of spaced apertures 68 defined therein. Wall 66 is solid immediately adjacent segment 56 of surface 46 and with a radius of curvature equal to that of segment 56.

Tube 62 has an end (not shown) facing out of the drawings which is blocked off preventing the escape of air pressure. The end of tube 62 facing out of the drawing is not shown as it is broken away to reveal the interior of the tube 62. Tube 62 is connected at its opposite end to a source of pressure (not shown) which causes fluid pressure to be applied through the apertures 68 to the tape. The force provided by air pressure from tube 68 forces tape 16, at a point in between the capstan and the head, away from the capstan 44 and toward head 18.

Vacuum block 58 blocks the vacuum in area 50 along a portion of the peripheral surface of capstan 44 extending beyond the edges of tube 62 thereby allowing the tape to be released from the capstan slightly before it reaches the tube.

Capstan 44 is rotatably coupled to a shaft **14*a* through which the capstan is rotated in either of its two directions. As with the embodiment of FIG. 2, the maximum excursion (repulsion) of the tape from the capstan's peripheral surface is at a point on the tape most-adjacent the head 18. In other words, the transport of FIG. 3 is perfectly symmetrical on either side of both head assembly 18 and capstan 44** thereby substantially eliminating the problems inherent in the asymmetrically arranged tape transports of the past.

The capstan and head arrangement of FIG. 3 is preferred over that of transport 10 in FIG. 1 because tube 62 forms a pneumatic tape guide which eliminates the possibility of tape oscillation under head assembly 18 caused by air passing through the moving apertures 48 in capstan 44.

What has been described, therefore, is a unique capstan and transducer assembly arrangement especially designed to enable extremely rapid tape accelerations and decelerations by the capstan to tape speeds of 350 ips or higher. The transducer assembly is positioned adjacent the capstan in reading relation with a portion of the tape which is driven about the capstan. Means force the portion of the tape away from the capstan and against the transducer assembly.

What is claimed is:

1. In a magnetic tape transport, a tape transporting and reading assembly comprising:

a. a bidirectionally driven capstan about which such tape is wrapped and by which such tape is driven;

b. a magnetic transducer assembly positioned adjacent a segment of the capstan in reading relation with a portion of such tape which is passing around said segment of the capstan; and c. means applying a force on such tape at a position in between said transducer assembly and capstan to move such tape away from said segment of the capstan toward said transducer assembly.

2. The assembly of claim 1, wherein the force applying means comprises means for directing a fluid pressure against such tape.

3. The assembly of claim 2, wherein the fluid pressure directing means is external to the capstan and is positioned in between said transducer assembly and capstan.

4. The assembly of claim 3, wherein the fluid pressure directing means is tubular and has a portion thereof facing the tape through which fluid pressure passes.

5. The assembly of claim 2, wherein the capstan is a vacuum capstan, the vacuum drawing the tape against first and second segments of the periphery of the capstan on opposite sides of the segment where it is forced away by the fluid pressure directing means.

6. The assembly of claim 5, further comprising means for blocking the vacuum in the capstan at either side of the fluid pressure directing means along the tape path to allow the tape to move away from the periphery of the capstan more easily.

7. The assembly of claim 2, wherein the fluid pressure directing means is internal to the capstan, the capstan having an outer wall permitting air pressure to pass therethrough from the fluid pressure directing means to the tape.

8. The assembly of claim 7, wherein the capstan has fluid pressure directing means including a tubular member with a portion thereof, through which the fluid pressure passes, facing the interior of the wall of said capstan, the wall being constructed to permit the fluid pressure to pass therethrough against the tape.

9. In a magnetic tape transport, an electromagnetic transducer and capstan arrangement comprising:

a. a capstan having a peripheral surface about which magnetic tape is driven;

b. an electromagnetic transducer positioned adjacent a segment of the peripheral surface for information transfer with the tape adjacent the segment; and c. fluid pressure means applying a force on the portion of the tape passing about the segment for repelling the tape away from the segment toward the transducer so that the part of the tape repelled furthest from the capstan is also the part most-adjacent the transducer.

10. The arrangement of claim 9, wherein the fluid pressure means is disposed between the capstan and the head.

11. The arrangement of claim 9, wherein the fluid pressure means includes positive air pressure disposed between the segment and the tape.

12. The tape transport of claim 9, wherein the capstan is a pneumatic capstan and the fluid pressure means includes a contained area of positive air pressure immediately adjacent the segment of the peripheral surface.

13. The tape transport of claim 12, wherein the contained area of positive air pressure is within the capstan.

14. The tape transport of claim 12, wherein the contained area of positive air pressure is without the capstan.

15. The tape transport of claim 14, wherein the area of positive air pressure is contained within an air bearing having a solid concave surface, adjacent the peripheral surface of the capstan, and a perforated convex surface adjacent the head and away from which the tape is repelled as it is driven past the head.

16. The tape transport of claim 14, further comprising an area of negative air pressure, contained within the capstan and abutting a portion of the peripheral surface, for attracting magnetic tape to the peripheral surface along the portion.

17. In a high-speed magnetic tape transport, a tape transporting and reading assembly comprising:

a. a pair of reels driving means between which such tape is transported;

b. a pair of vacuum tape buffers between said reel driving means through which such tape passes;

c. a bidirectional capstan positioned in between said buffers along the path of such tape and about which such tape is wrapped and by which such tape is driven;

d. a transducer assembly positioned adjacent the capstan in reading relation with a portion of such tape which is passing around said capstan; and e. means for directing a force on such tape at a position in between said transducer assembly and capstan which forces such tape away from said capstan and against said head assembly.

18. In a high-speed magnetic tape transport according to claim 17, wherein said force directing means comprises means for directing a fluid pressure against such tape.

19. In a high-speed magnetic tape transport according to claim 18, wherein said capstan is a vacuum capstan, the vacuum passing through said capstan to draw tape onto the periphery of said capstan.

20. In a magnetic tape transport including a capstan having a peripheral surface about which tape is driven and an electromagnetic head adjacent a first segment of the surface for reading or writing relative to the tape which is about the first segment, a method for spacing the tape between the capstan and the head comprising the steps of frictionally engaging the tape with a second segment of the surface which is continuous with one end of and longer than the first segment, repelling the tape away from the first segment toward the head such that the portion of the tape repelled furthest from the capstan is also the part most-adjacent the head, and frictionally engaging the tape with a third segment of the surface which is continuous with the other end of the first segment.

* * * * *